Figure 1:
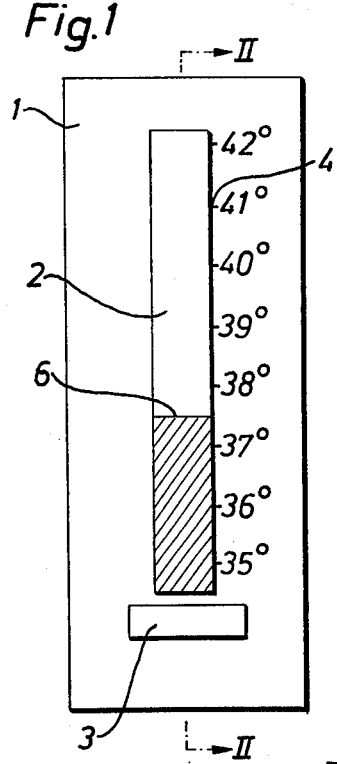

United States Patent [19]

Helgesson

[11] 3,961,530
[45] June 8, 1976

[54] METHOD AND THERMOMETER FOR MEASURING TEMPERATURE BY DETERMINATION OF SATURATION OF A SOLVENT HAVING TEMPERATURE DEPENDENT CHARACTERISTICS

[75] Inventor: Claes Ivar Helgesson, Akersberga, Sweden

[73] Assignee: Arbman Development AB, Stockholm, Sweden

[22] Filed: Oct. 24, 1974

[21] Appl. No.: 517,750

[30] Foreign Application Priority Data
Nov. 1, 1973 Sweden .............................. 7314906

[52] U.S. Cl. .......................... 73/339 R; 23/253 TP; 73/356
[51] Int. Cl.² .................... G01K 11/12; G01K 3/00
[58] Field of Search .......... 73/53, 60.1, 61.1, 339 R, 73/356, 17 A, 17 R, 343.5; 116/114 V, 114.5; 23/253 TP

[56] References Cited
UNITED STATES PATENTS

| | | | |
|---|---|---|---|
| 2,552,477 | 5/1951 | Cole | 73/339 R UX |
| 2,807,956 | 10/1957 | Doble | 73/61.1 R |
| 3,420,205 | 1/1969 | Morison | 73/339 R X |
| 3,620,677 | 11/1971 | Morison | 23/253 TP |

*Primary Examiner*—Richard C. Queisser
*Assistant Examiner*—Frederick Shoon
*Attorney, Agent, or Firm*—Pierce, Scheffler & Parker

[57] ABSTRACT

The thermometer of the invention is characterized by a substance, preferably a salt, the solubility of which changes with temperature and which is present in a solid or liquid phase in the temperature range in which the thermometer is intended to be used, said substance being extended in a space such as a column or the like one end of which space is arranged to be brought into contact with a specified quantity of a liquid solvent for said substance. Measurement of temperature is performed by observing how much of the substance will be dissolved before saturation of the liquid solvent.

13 Claims, 5 Drawing Figures

U.S. Patent  June 8, 1976  3,961,530

METHOD AND THERMOMETER FOR MEASURING TEMPERATURE BY DETERMINATION OF SATURATION OF A SOLVENT HAVING TEMPERATURE DEPENDENT CHARACTERISTICS

The present invention relates to a method for measuring temperature and a thermometer for use in said method.

A temperature sensing device including a strip of a porous material arranged on a backing is disclosed in U.S. Pat. No. 3,324,723. To one end of the strip there is attached by fusing a drop of a coloured substance, which has been allowed to solidify. When the device is being used at a temperature above the fusing point of the substance this will spread along the strip. The spreading of the substance then is a measure of the period under which the device is exposed to a temperature at or above the fusing point.

As distinct from this prior art there is provided according to the present invention a method and a thermometer, respectively, the reading of which is adapted to indicate more than a single specific temperature level and the purpose of which is to avoid the dependence of time mentioned above. Another substantial advantage of the method and the thermometer according to the present invention is that the latter may be stored for a practically unlimited period of time and may be stored also at very high temperatures, i.e. temperatures exceeding the range in which the thermometer is adapted to be used, without the operability being spoiled. The only requisite is that the thermometer is stored at a temperature just below the range of intended use a few minutes before use.

The method according to the invention is characterized in that the measurement is performed by observing the ability of a liquid to dissolve, in dependence of temperature, a substance, preferably a salt, the solubility of which changes with temperature and which is present in a solid or liquid phase in the temperature range in which the intended measurement is to take place.

In a corresponding manner the thermometer according to the invention is characterized by a substance, preferably a salt, the solubility of which changes with temperature and which is present in a solid or liquid phase in the temperature range in which the thermometer is intended to be used said substance being extended as in a column or the like one end of which is arranged to be brought into contact with a specified quantity of a liquid solvent for said substance the measurement being performed by observing how much of the substance will be dissolved before saturation of the liquid solvent.

If the thermometer according to the invention is provided with said substance in a liquid phase this substance preferably is brought to fill completely a capillary tube or the like made of glass, plastics material, or the like, one end of which may be brought into contact with a container for the liquid solvent e.g. by means of an easily breakable wall. As an alternative to said capillary tube there may be used for example a capillary slot between two glass plates or the like.

If it is desired to use instead a substance in a solid phase this substance may be provided as a coating on or an impregnation in a preferably porous elongated material body such as a strip of filter paper type, a fabric of natural or synthetic fibres, or a porous mass of a plastics material, glass or the like having a porosity said body preferably being arranged on a backing.

Thus, the thermometer according to the invention is so arranged that the solvent and the strip or the capillary or the like do not come into contact with each other before the thermometer is to be used. When the thermometer is to be activated one end of the porous strip or the capillary is brought into contact with the solvent. The principle is based on the fact that the solubility of salts and similar substances in certain cases varies with temperature. Preferably, there is used such a substance in which the solubility increases with increasing temperature. Dependent on the temperature of the system the solvent can dissolve more or less of the substance i.e. under the influence of capillary forces it can penetrate to different depths in the porous material or the capillary. When the solvent and the substance have been brought into contact with each other the system immediately tends to attain equilibrium in respect of dissolution of the necessary quantity of the substance so that a saturated solution will be obtained. The saturated solution thus being obtained due to the fact that the solvent penetrates into the porous material and dissolves the required quantity of the substance.

If it is desired to chose a porous material as a carrier for the saturated substance, papers e.g. of filter type or cigarette type are preferred. However, the invention is not of course limited to these materials; also other materials which provide a capillary effect are usable such as porous ceramic materials. The porous material preferably is arranged on a backing. This backing preferably should have a good heat conductivity for obtaining temperature equilibrium rapidly. A suitable material is a metal foil but the invention is not, of course, limited to this material.

According to a preferred embodiment of the invention the solvent in the container includes from the beginning a specified quantity of the soluble substance. Thereby the speed of the temperature measurement will be increased and the need of a long strip or capillary will be eliminated, i.e. the equilibrium will be obtained more rapidly and on a shorter portion of the porous strip or the capillary. Above all, the solvent in the container will be saturated at a temperature immediately below the temperature range of the thermometer.

While the embodiment mentioned above, having a specified quantity of said substance in the solvent, in most cases provides a substantial improvement in relation to pure solvent in the container it has a minor restriction. In case the thermometer for some reason must be stored at a temperature which is much lower than the intended temperature range there is thus a risk that the substance will deposit as large crystals. Then, when the thermometer is to be used the dissolution of these large crystals will take place so slowly that the solvent begins to dissolve the substance in the porous strip before the dissolution of the crystals in the container is finished whereby a false temperature measurement will be obtained.

In an embodiment of the thermometer according to the invention which does not have this disadvantage a specified quantity of the substance, preferably the quantity which saturates the solvent at a temperature just below the intended temperature range, is contained in a separate container which is provided in connection with but is separated from the container containing the solvent. Thereby the substance and the solvent will be kept separated until the thermometer is to be used the contents of the two containers then being brought into contact with each other in order to provide a solution of the substance which solution then will be brought into contact with the strip or the capillary. In this case it is essential that the substance in the container is allowed to solve completely before contact is provided.

Alternatively the part of the strip or the capillary which faces the container with solvent may be coated with and contain, respectively, an especially large quantity of the substance whereby the length may be reduced.

The embodiment having separate containers for solid substance and solvent is not limited to any special constructive arrangement of the containers. Thus, two completely separate but juxtaposed containers may be used, the two containers being brought into contact with each other. By breaking the container which is closest to the strip or the capillary, the solution formed then will be brought into contact with the souble substance. Another embodiment includes use of a container which contains an inner, thin, easily breakable partition wall which defines two chambers for substance and solvent, respectively, and a thin, easily breakable wall facing the strip or the capillary. A further possible embodiment implies the use of two capsules one of which is disposed inside the other.

The indication of the temperature is nearly instantaneous provided substances of good solubility are chosen. In order to further increase the rate of dissolution there is used preferably a salt having very small, preferably finely ground crystals or crystals which have been dried for instance from a water solution so rapidly that small crystals have been formed.

Alternatively a substance may be used which fuses within or just below the actuval temperature range. Also in this case there will be obtained, of course, a rapid dissolution.

Generally, the temperature reading thus may be performed very rapidly after the activation of the thermometer whereby the capillary forces i.e. the risk of further penetration of the solvent into the pores of the porous material or into the capillary beyond the point of equilibrium will be of no practical consequence compared to the chemical driving force which will bring the solution to saturation. However, according to a preferred embodiment of the invention the penetration of liquid into the pores of the porous material or into the capillary can be further prohibited by adding to the solvent in the container a wetting reducing agent e.g. cetyl trimethyl ammonium bromide, or by making the porous material hydrophobic e.g. by treating this material with a compound or the so called silicones.

The temperature reading when using a porous mass i.e. the indication of the distance over which the solvent will penetrate into the porous strip can be performed either by means of the grease spot principle i.e. by observing the change of translucency of the porous material in a wet condition in relation to the dry condition, or by means of an indicator with which the porous strip is also impregnated and which changes colour when the substance is dissolved. The indicator has to be chosen in dependence of the actual system of salt/solvent. In water based systems the porous strip may contain a chemical composition which when drying will be changed to a colourless (or only slightly coloured) anhydride form but which when contacted by water (i.e. when the water phase penetrates into the strip) will be transferred to a coloured modification containing water. Examples of such indicators are $CuSO_4$ (light green) — $CuSO_4.5H_2O$ (dark blue) and $NiCl_2$ (light yellow) — $NiCl_2.6H_2O$ (green). Alternatively the back side of the porous strip may be coated on the surface thereof with a thin layer of a water soluble dye which will be dissolved when the water solution rises, and will colour the strip to the level to which the water solution has risen. The strip may also have a pH indicator added thereto which changes colour when contacted by the water solution. Indicator type and status has to be chosen in dependence of the pH value of the solution. Preferably the backing is provided with scale divisions for different temperatures.

As a further alternative there may be added to the solvent a dye which during use will be distributed over the entire solution but will not colour the portion of the substance, which has not been dissolved.

Substantially similar principles can of course also be adopted when a capillary tube or the like is used instead of such a porous strip to contain the soluble substance.

The strip may be impregnated by dipping the strip into a saturated solution of the desired substance and by drying the strip subsequently. Since the crystals obtained as mentioned above should be very small the drying preferably is performed at a relatively high temperature e.g. 70° to 100°C when water is used as a solvent. The substance may also be applied by supplying finely ground crystals to the strip which are bound to the porous strip by means of a binding agent which is soluble in the solvent used. Gelatin and carboxyethyl cellulose are examples of usable water soluble binding agents. In order to increase further the speed of the dissolution of the substance in the solvent, particles may be used which have been ground from large crystals or from pieces obtained by fusing the substance. By grinding the crystals obtained have a crystal structure such that the dissolution in the solvent will be accelerated. Alternatively, the substance may be applied to the porous material or be introduced into the capillary by the substance being fused and allowed to penetrate into the pores of the material and into the capillary, respectively.

The system of substance/solvent is chosen so that a difference as large as possible in solubility will be obtained when the temperature is changed within the actual temperature range. Illustrative systems of substance/solvent which may be used are given in Table 1 below. When measuring temperatures in the range from 30° to 50°C i.e. especially when measuring the body temperature, especially the salts $KAl(SO_4)_2$, $KNO_3$, $MN(NO_3)_2$ and $Na_2S_2O_3$ are preferred.

Although the invention may advantageously be applied to salts it is by no means limited thereto. Any substance for which a solvent can be found which has the required properties of good dissolving ability and a great difference in solubility in the actual temperature range may also be used e.g. carbohydrates such as sugar and cyclic hydrocarbons etc.

Table 1

| Substances | Solvents |
| --- | --- |
| $AlBr_3$ | cyclohexane |
| $KAl(SO_4)_2$ | water |

Table 1-continued

| Substances | Solvents |
| --- | --- |
| $CaBr_2$ | propyl alcohol |
| calcium lactate | formic acid |
| $CaCl_2 . 3C_2H_5OH$ | ethanol |
| $Cd(HCOO)_2$ | water |
| $K\ Sn\ Br_3$ | water |
| $C_{10}H_{21}SO_3Na$ | water |
| naphtalene | benzol |
| naphtalene | dichloroethane |
| 2,5-dinitrofenol | bensol |
| O-acetotoluid | 2-propanol |
| $KNO_3$ | water or water with 0.1 g $NH_3$/ml |
| $KNbO_3$ | water |
| $LiBO_2$ | water |
| $LiBr_2$ | acetone |
| $MgI_2 . 6CH_3COOC_3H_7$ | propyl alcohol |
| $Na_2S_2O_3$ | water |
| $(CH_3)_3PbF$ | water or ethanol |
| $Sb\ Br_3$ | tetrahydrobenzene |

An important characteristic of the thermometer according to the invention is that when the thermometer is in an inactive state i.e. during storage, the solvent will not come into contact with the soluble substance. Thereby it is achieved primarily the essential advantage that the operation will not be destroyed should the thermometer be exposed to higher temperatures than those for which it is constructed. The only requirement to have the thermometer operate satisfactorily is that it be stored at a temperature which is just below the actual temperature range e.g. at a temperature under 35°C when used for measuring the body temperature, a few minutes before it is to be used.

The solvent in the container may be prevented from coming into contact with the soluble substance by using a container which is completely closed or which is disposed at a predetermined distance from the end of the strip. However, if in said latter case the container is provided with a small opening certain precutions will be required during the storing of the thermometer so that the thermometer is stored in a vertical position.

The preferred embodiment thus involves the use of a closed container. In this case the container shall be made of an easily breakable material, preferably a plastics material, so that the contents thereof may be brought into contact with the soluble substance simply by breaking the container. Preferably only that portion of the container which faces the substance is made of a breakable material so that the solvent does not flow out at the sides thereof. For the activation of the thermometer, the strip and the capillary, respectively, and the container may be slidable in relation to each other. When there is used a rigid strip, or a strip the end of which is provided with a sharp point, or a capillary formed in a corresponding way it is possible to break the container by displacing the strip or the container. The preferred embodiment has a closed container arranged close to the strip or the capillary so that the solvent and the strip or capillary may be brought into contact with each other simply by breaking the container. In case of two containers, preferably closed containers are used, the parts thereof which are facing each other and the part thereof which is facing the strip being of an easily breakable material whereby the containers may be broken in two completely separate stages.

In order to protect the active components of the thermometer i.e. the porous strip or the capillary having the solid substance and the solvent, there is preferably provided an outer covering of a transparent or translucent material such as a plastics material or glass. This covering should have a close fit against the contents thereof so that the solvent does not flow out at the sides. In order that the covering shall not disturb the measuring it should consist of an hydrophobic material such as polytetrafluorethylene, or a material treated to be hydrophobic e.g. a material treated with silicone or polytetrafluorethylene.

Figure 2:
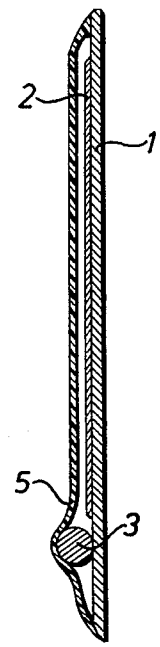

The invention will now be further illustrated with reference to the accompanying drawing in which FIG. 1 is a front view of a first embodiment of the thermometer according to the invention, FIG. 2 is a cross sectional view of the thermometer according to FIG. 1 taken along the line II — II in FIG. 1.

Figure 3:
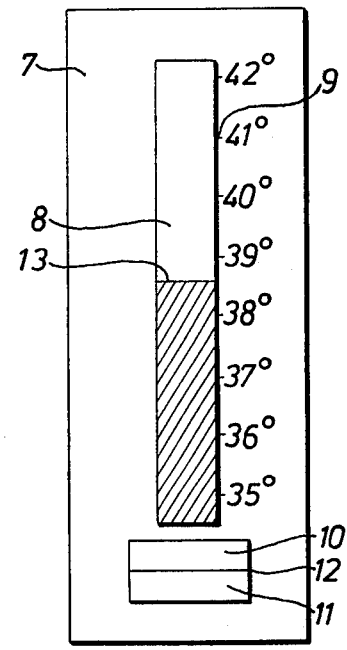
Figure 4:
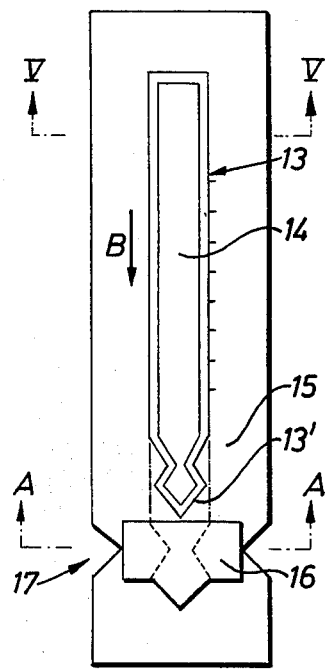
Figure 5:
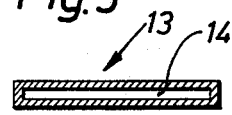

FIG. 3 is a front view of a second embodiment of the thermometer according to the invention, FIG. 4 is a front view of a third embodiment, and FIG. 5, finally, is a cross sectional view of a capillary provided in the thermometer according to FIG. 4 taken along the line V — V in FIG. 4.

In FIG. 1 it will be seen that the thermometer comprises a backing 1 to which there is attached a strip 2 of a porous material. Strip 2 has been impregnated with a saturated salt solution and then dried. At one end of strip 2 but separated therefrom there is provided a closed container or capsule 3 containing a salt solution of the same type, which has been saturated at a temperature below the temperature range which is to be measured. On the backing there are also provided scale divisions 4 for different temperatures. As will be seen from FIG. 2 there is also provided over backing 1, strip 2, and capsule 3 a transparent covering 5 which is resistent to the solvent.

In the present case the temperature range to be measured extends between 35° and 42°C as will be seen from scale 4. In that case there will be supplied to capsule 3 a salt solution which has been saturated at 34°C. When the thermometer is to be used capsule 3 is crushed by means of a light pressure from the thumb. Thereby, the salt solution in capsule 3 will be brought into contact with strip 2. Since covering 5 is sealed to the longitudinal margins of strip 2 and capsule 3 the distribution of the salt solution will be limited substantially to strip 2. As long as the temperature is below 34°C there is in the capsule 3 a saturated solution plus salt crystals, and no solution will be absorbed by strip 2. If the temperature raises over 34°C the solution in capsule 3 will be unsaturated and, therefore, it will dissolve the salt with which strip 2 is impregnated. As a consequence thereof solution will be absorbed by strip 2 and the higher the temperature the higher the level to which the solution will rise. Thus, there will be obtained a border 6 of the liquid, which is dependent of the temperature.

The thermometer disclosed in FIG. 3 is constructed substantially in the same way as that disclosed in FIG. 1 with a backing 7 on which there is provided a porous strip 8 impregnated with a salt, and a temperature scale 9. At one end of the strip there is provided a capsule 10 containing salt crystals, and a capsule 11 containing a solvent said two capsules having a common partition wall 12.

When the thermometer is to be used partition wall 12 is crushed initially so that the crystals in capsule 10 will be brought into contact with the solvent in capsule 11. Then, when the crystals are dissolved completely in the solvent the wall of capsule 10, facing strip 8, will be crushed so that the solution will be brought into contact with the strip. Thereby, the salt solution will be absorbed by strip 8 and will dissolve the salt with which the strip is impregnated, in dependence of the temperature of the surroundings. The border dependent of the temperature is indicated in the figure at 13.

FIG. 4, and FIG. 5 finally, discloses a further embodiment of the invention. In This embodiment strips 2 and 8 have been replaced by a capillary tube 13 having an internal capillary slot 14. Generically, the strips 2 and 8 and tube 13 are defined as columnar means. Tube 13 is arranged on a backing 15 to be movable in the direction of arrow B. Thereby it may be brought to penetrate at the point 13' thereof into a container 16 corresponding to containers 3 and 10, 11, respectively, described above. Opposite container 16 backing 15 is provided with a breaking kerf 17 to be broken along line A — A. Thus, when point 13' has penetrated into container 16 it is the intention that the backing together with container 16 and capillary tube 17 shall be broken about line A — A. Thereby, the substance in capillary slot 14 will be brought into contact with the solvent in container 16, and the operation will be the same as in the embodiments described above. Also the embodiment according to FIGS. 4 and 5 preferably is enclosed by an outer covering of a plastics material or the like which closely follows the contents thereof. For the sake of simplicity such covering has been omitted from the figure.

For the sake of simplicity there are disclosed no guiding means for capillary tube 13. However, for the man skilled in the art it will be clear that such guiding mans may be arranged in many different manners independently of the present invention.

The invention will be further illustrated by the following concrete examples.

EXAMPLE 1

A filter paper 7 mm wide was impregnated with a saturated water solution of $KNO_3$ and was dried. The paper then was found to contain 0.0055 g/mm length. The paper was brought into contact with 1 ml of a solution of $KNO_3$ saturated at 21°C (containing 0.24 g $KNO_3$/ml). The system was brought to the intended temperature and had attained equilibrium after 30 sec. Then, the liquid had penetrated into the paper as follows:

| at 35°C | 27.5 mm |
|---|---|
| 37°C | 30.5 mm |
| 39°C | 33.5 mm |

EXAMPLE 2

A cigarette paper 7 mm wide was impregnated with a saturated water solution of $KNO_3$ containing 0.1 g $NH_3$/ml. After drying the paper contained 0.002 g $KNO_3$/mm length. The paper was brought into contact with 1 ml of a solution of $KNO_3$ saturated at 21°C and containing 0.1 g $NH_3$/ml (containing 0.18 g $KNO_3$/ml). Equilibrium was attained after 30 sec. at the intended temperature and the liquid had penetrated into the paper as follows:

| at 35°C | 27.5 mm |
|---|---|
| 37°C | 33 mm |
| 39°C | 37 mm |

EXAMPLE 3

A polyethylene tube having an inner diameter of 1.143 mm was filled with the substance $Na_2S_2O_3.5H_2O$ heated to a temperature of about 50°C i.e. over the fusing point of the salt. The fused material was sucked into the capillary and one opening thereof was sealed. The open end of the capillary was brought into contact with 0.1 ml of a solution of $Na_2S_2O_3$ saturated at 30°C, in a chamber at the temperatures 40° and 45°C. After 5 minutes at the intended temperature the level to which the solvent had raised was observed. The following results were obtained:

| at 40°C | about 4.7 mm |
|---|---|
| 45°C | about 8.5 mm. |

Although the invention has been described above with reference to systems usable for measuring the body temperature it is of course not limited to such systems. Thus the invention is adaptable on any temperature range for which there is a system of substance and solvent having the properties mentioned above.

I claim:

1. A method for determining a temperature within a predetermined temperature range comprising contacting a solute in columnar form with a solvent therefor at one end thereof while being subjected to the temperature to be determined, said solvent being unsaturated with solute at the temperature within said predetermined temperature range and the amount of said solute soluble in said solvent varying in accordance with the temperature thereof, and determining the amount of solute progressively dissolved in said solvent when saturated with solute after contacting the solute with said solvent, to determine the temperature thereof.

2. A method as claimed in claim 1 wherein said solute is a salt.

3. A method as claimed in claim 1 wherein said solvent, prior to contacting said solute, contains a quantity of said solute insufficient to saturate said solvent at temperatures within said predetermined temperature range.

4. A method as claimed in claim 1 wherein said solvent is saturated with said solute at a temperature just below the lowest temperature of said predetermined temperature range.

5. A thermometer for measuring temperature within a predetermined temperature range comprising a columnar means containing a soluble substance, frangible means containing a specified quantity of a solvent for said soluble substance and disposed at one end of said columnar means, said frangible means normally separating said soluble substance from said solvent, and a temperature scale associated with said columnar means, said solvent and soluble substance having solubility characteristics which change with temperature and said solvent being unsaturated with the soluble substance at temperatures within said predetermined temperature range whereby when said frangible means is broken said solvent progressively dissolves the soluble substance in said columnar means until the solvent becomes saturated with the soluble substance and the extent to which said soluble substance is dissolved indicating the existing temperature on said temperature scale.

6. A thermometer as claimed in claim 5 wherein said columnar means comprises a capillary means of transparent material.

7. A thermometer as claimed in claim 5 wherein said columnar means comprises an elongated strip of porous material impregnated with said soluble substance.

8. A thermometer as claimed in claim 7 wherein said frangible means is attached to one end of said elongated strip of porous material.

9. A thermometer as claimed in claim 7 wherein said elongated strip of porous material has hydrophobic characteristics.

10. A thermometer as claimed in claim 5 wherein said columnar means comprises an elongated strip of material having a coating of said soluble substance.

11. A thermometer as claimed in claim 5 wherein said frangible means includes two compartments, one containing the solvent and the other containing a quantity of the soluble substance which will saturate said solvent at a temperature below said predetermined temperature range, and said frangible means further including a frangible barrier between the two compartments so that when said frangible barrier is broken said solvent may dissolve the soluble substance in said second compartment before breaking said frangible means for measuring the temperature in the predetermined temperature range.

12. A thermometer as claimed in claim 5 wherein said solvent contains an agent for reducing wetting.

13. A thermometer as claimed in claim 5 wherein a color indicator is added to said soluble substance which changes color when dissolved in said solvent.

* * * * *